United States Patent
Azuma et al.

(10) Patent No.: US 9,771,074 B2
(45) Date of Patent: Sep. 26, 2017

(54) VEHICLE CONTROL DEVICE AND CONTROL METHOD

(71) Applicant: MAZDA MOTOR CORPORATION, Hiroshima (JP)

(72) Inventors: Takashi Azuma, Hiroshima (JP); Tetsutaka Shibata, Hiroshima (JP); Naoto Kawahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 269 days.

(21) Appl. No.: 14/430,520

(22) PCT Filed: Apr. 18, 2014

(86) PCT No.: PCT/JP2014/061050
§ 371 (c)(1),
(2) Date: Mar. 23, 2015

(87) PCT Pub. No.: WO2014/175182
PCT Pub. Date: Oct. 30, 2014

(65) Prior Publication Data
US 2015/0239471 A1    Aug. 27, 2015

(30) Foreign Application Priority Data

Apr. 26, 2013    (JP) .................... 2013-094592

(51) Int. Cl.
*F16H 59/44*    (2006.01)
*F16H 59/46*    (2006.01)
(Continued)

(52) U.S. Cl.
CPC .......... *B60W 30/146* (2013.01); *B60W 10/04* (2013.01); *B60W 10/06* (2013.01);
(Continued)

(58) Field of Classification Search
CPC ...... F16H 59/44; F16H 59/46; F16H 61/0213; F16H 2061/022; F16H 2061/0015; B60W 30/146

See application file for complete search history.

(56) References Cited

U.S. PATENT DOCUMENTS

2005/0143221 A1*  6/2005  Kuwahara ........... F16H 61/0213
                                                             477/97
2008/0070747 A1*  3/2008  Kitamura .............. B60W 10/06
                                                             477/107
(Continued)

FOREIGN PATENT DOCUMENTS

EP    1925487 A2    5/2008
EP    1961605 A2    8/2008
(Continued)

OTHER PUBLICATIONS

International Search Report; PCT/JP2014/061050; Jul. 8, 2014.

*Primary Examiner* — Huan Le
(74) *Attorney, Agent, or Firm* — Studebaker & Brackett PC (57) ABSTRACT

Even if an adjustable speed limitation function (ASL) sets a vehicle speed upper limit to a relatively low vehicle speed, a control unit 10 is configured to, in order to suppress the problem of a decrease in fuel efficiency while the ASL is executing the vehicle speed limitation, suppress an output of an engine 2 so that the vehicle speed does not exceed the vehicle speed upper limit, and cause a gear stage of an automatic transmission 3 to be shifted up to a higher speed side gear stage having higher fuel efficiency than a gear stage that is set based on the driving state of a vehicle 1, when a deviation between the vehicle speed detected by a vehicle speed sensor 21 and the vehicle speed upper limit (Continued)

that is set by a vehicle speed upper limit setting switch 24 becomes less than a predetermined threshold.

21 Claims, 5 Drawing Sheets (51) Int. Cl.
*B60W 30/14* (2006.01)
*B60W 10/04* (2006.01)
*B60W 10/06* (2006.01)
*B60W 10/11* (2012.01)
*F02D 29/02* (2006.01)
*F16H 61/02* (2006.01)
*B60W 30/188* (2012.01)
*F16H 59/74* (2006.01)
*F16H 61/00* (2006.01)

(52) U.S. Cl.
CPC ......... *B60W 10/11* (2013.01); *B60W 30/188* (2013.01); *F02D 29/02* (2013.01); *F16H 59/44* (2013.01); *F16H 59/74* (2013.01); *F16H 61/0213* (2013.01); *F16H 2059/743* (2013.01); *F16H 2061/0015* (2013.01); *F16H 2061/022* (2013.01); *Y02T 10/76* (2013.01)

(56) References Cited

U.S. PATENT DOCUMENTS

| | | | |
|---|---|---|---|
| 2008/0254935 A1* | 10/2008 | Kasuga | B60K 6/365 477/3 |
| 2009/0105041 A1* | 4/2009 | McKenzie | F16H 37/0846 477/41 |
| 2012/0016562 A1 | 1/2012 | Tetsuka et al. | |

FOREIGN PATENT DOCUMENTS

| | | |
|---|---|---|
| JP | H06-191323 A | 7/1994 |
| JP | H11-048821 A | 2/1999 |
| JP | 2004-211798 A | 7/2004 |
| JP | 2008-128452 A | 6/2008 |
| JP | 2008-207651 A | 9/2008 |
| WO | 2010/114025 A1 | 10/2010 |

\* cited by examiner

VEHICLE CONTROL DEVICE AND CONTROL METHOD

TECHNICAL FIELD

The present invention relates to a vehicle control device and a control method, in particular, to a control device and a control method for a vehicle having an ASL function that causes a vehicle speed not to exceed an upper limit of the vehicle speed.

BACKGROUND ART

In the past, vehicles equipped with a vehicle speed limitation function, so-called ASL (Adjustable Speed Limitation) in order to, for example, prevent traffic accidents due to vehicle overspeed have been known. When the present vehicle speed approaches a preset upper limit of the vehicle speed, the ASL starts limiting the vehicle speed and suppresses an output of an engine so that, even if a driver strongly presses an acceleration pedal, the vehicle speed does not exceed the upper limit of the vehicle speed.

For example, Patent Literature 1 discloses a technique that prohibits a gear stage from being changed when the vehicle speed approaches the vehicle speed upper limit, prevents downshifts and upshifts from successively occurring, and avoiding frequent gear change operations so that drivability does not deteriorate.

CITATION LIST

Patent Literature

Patent Literature 1: Japanese Unexamined Patent Publication No. 2008-128452 (paragraphs 0009 to 0010)

SUMMARY OF INVENTION

Generally, in the ASL, the vehicle speed upper limit is set to any vehicle speed. Thus, if the vehicle speed upper limit is set to a relatively low vehicle speed, while the vehicle is being accelerated in a low speed side gear stage, for example a first forward gear stage or a second forward gear stage, the vehicle speed limitation is started. While the vehicle speed limitation is being executed, when changes of the gear stage are prohibited like the technique disclosed in Patent Literature 1, since the vehicle continues to travel in a low speed side gear stage having a large gear ratio, a problem of a remarkable decrease in fuel efficiency occurs.

Therefore, an object of the present invention is to provide a vehicle control device and a control method in which, even if the ASL sets the upper limit of the vehicle speed to a relatively low speed state, a problem of a decrease in fuel efficiency is suppressed while the ASL is executing the vehicle speed limitation.

To solve the foregoing problem, the present invention is a vehicle control device including: vehicle speed detection apparatus for detecting a vehicle speed; vehicle speed upper limit setting apparatus for setting a vehicle speed upper limit of a vehicle; and engine control apparatus for suppressing an output of an engine so that the vehicle speed detected by the vehicle speed detection apparatus does not exceed the vehicle speed upper limit that is set by the vehicle speed upper limit setting apparatus when a predetermined condition is satisfied, the vehicle control device further including: gear stage setting apparatus for setting a gear stage of a transmission based on a driving state of the vehicle; and shift-up apparatus for shifting up the gear stage of the transmission to a higher speed side gear stage having higher fuel efficiency than a gear stage that is set by the gear stage setting apparatus when the output of the engine is suppressed by the engine control apparatus.

In addition, to solve the foregoing problem, the present invention is a vehicle control method including: a vehicle speed detection step for detecting a vehicle speed; a vehicle speed upper limit setting step for setting a vehicle speed upper limit of a vehicle; and an engine control step for suppressing an output of an engine so that the vehicle speed detected in the vehicle speed detection step does not exceed the vehicle speed upper limit that is set in the vehicle speed upper limit setting step when a predetermined condition is satisfied, the vehicle control method further including: a gear stage setting step for setting a gear stage of a transmission based on a driving state of the vehicle; and a shift-up step for shifting up the gear stage of the transmission to a higher speed side gear stage having higher fuel efficiency than a gear stage that is set in the gear stage setting step while the engine control step is being performed.

These and other objects, features and advantages of the present invention will become more apparent in light of the following detailed description of an embodiment thereof, as illustrated in the accompanying drawings.

DESCRIPTION OF EMBODIMENT

Next, with reference to the accompanying drawings, an embodiment of the present invention will be described.

(1) Overall Structure

Figure 1:
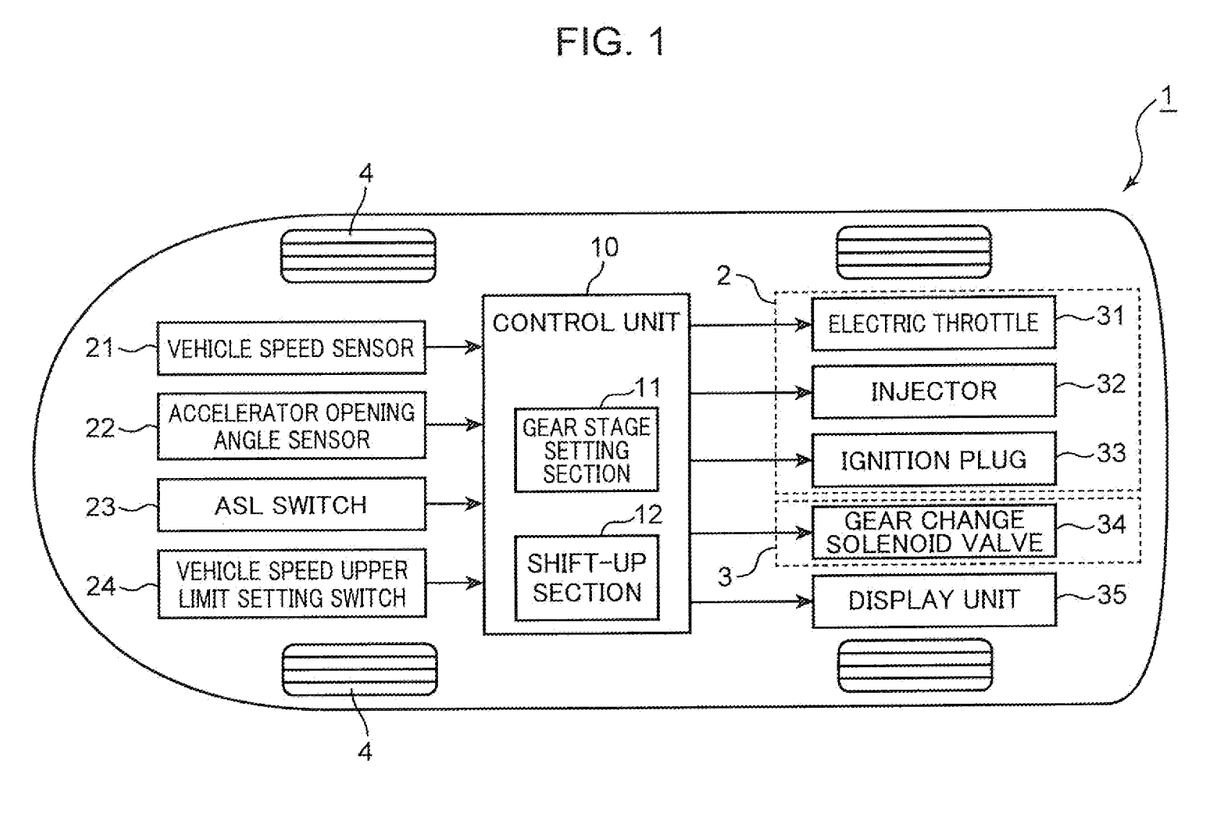
FIG. 1 is a schematic diagram showing a control system for a vehicle according to an embodiment of the present invention.

As shown in FIG. 1, a vehicle 1 according to the present embodiment includes, as a power train, an engine 2 and an automatic transmission 3 that changes the number of rotations of the engine 2 and transmits the rotations to wheels. The engine 2 is an internal combustion engine that burns fuel such as gasoline or light oil and generates drive force. The automatic transmission 3 is connected to the engine 2 through a torque converter (not shown). The automatic transmission 3 tightens or releases a plurality of friction elements, and achieves a plurality of gear stages including first forward gear stage to sixth forward gear stage and a rear gear stage. While a gear stage is being achieved, a torque transmission path is formed in the automatic transmission 3 between an engine 2 side and a drive wheel 4 side.

The vehicle 1 includes a control unit 10 that controls the engine 2 and the automatic transmission 3. The control unit 10 is formed of a microprocessor including a CPU, a ROM, and a RAM. The control unit 10 includes a gear stage setting section 11 that sets a gear stage of the automatic transmission 3 based on a gear change map (refer to FIG. 2) that will be described later; and a shift-up section 12 that shifts up the gear stage of the automatic transmission 3 while the ASL control is being executed as will be described later.

The control unit 10 is electrically connected to a vehicle speed sensor 21 that corresponds to a vehicle speed detection apparatus and that detects a traveling speed of the vehicle 1 (vehicle speed); an accelerator opening angle sensor 22 that corresponds to an accelerator opening angle detection apparatus and that detects an accelerator operation amount of the driver (a pressing amount of an accelerator pedal (not shown)); an ASL switch 23 that enables and disables the ASL (Adjustable Speed Limitation) function (vehicle speed limitation function); and a vehicle speed upper limit setting switch 24 that corresponds to a vehicle speed upper limit setting apparatus and that sets the vehicle speed upper limit in the ASL. A step that causes the vehicle speed sensor 21 to detect the vehicle speed corresponds to a vehicle speed detection step. A step that causes the vehicle speed upper limit setting switch 24 to set the vehicle speed upper limit corresponds to a vehicle speed upper limit setting step.

The control unit 10 executes the ASL control (vehicle speed limitation control) based on information that is input from the sensors 21, 22 and the switches 23, 24. In other words, when the vehicle speed detected by the vehicle speed sensor 21 approaches the vehicle speed upper limit that is preset by the vehicle speed upper limit setting switch 24, the control unit 10 starts the vehicle speed limitation and controls the output of the engine 2 so that even if the accelerator opening angle detected by the accelerator opening angle sensor 22 is large, the vehicle speed does not exceed the vehicle speed upper limit To execute the ASL control, the control unit 10 is mutually and electrically connected to an electric throttle (having a throttle valve that is opened and closed by an electric actuator such as a motor) 31 that is disposed in an air intake path (not shown) of the engine 2 and that adjusts an intake air amount; an injector 32 that injects fuel to the engine 2; an ignition plug 33 that ignites a mixture of fuel and air; and a gear change solenoid valve 34 that tightens or releases the plurality of friction elements of the automatic transmission 3. The control unit 10 outputs control signals to these members.

In addition, the control unit 10 outputs a control signal to a display unit 35. The display unit 35 is disposed in the vicinity of a driving seat, and displays to a driver an ON state (ASL function enabled) and an OFF state (ASL function disabled) of the ASL switch 23, and the vehicle speed upper limit that is set by the vehicle speed upper limit setting switch 24.

(2) Contents of Control

Next, the contents of the ASL control performed by the control unit 10 will be described.

Figure 2:
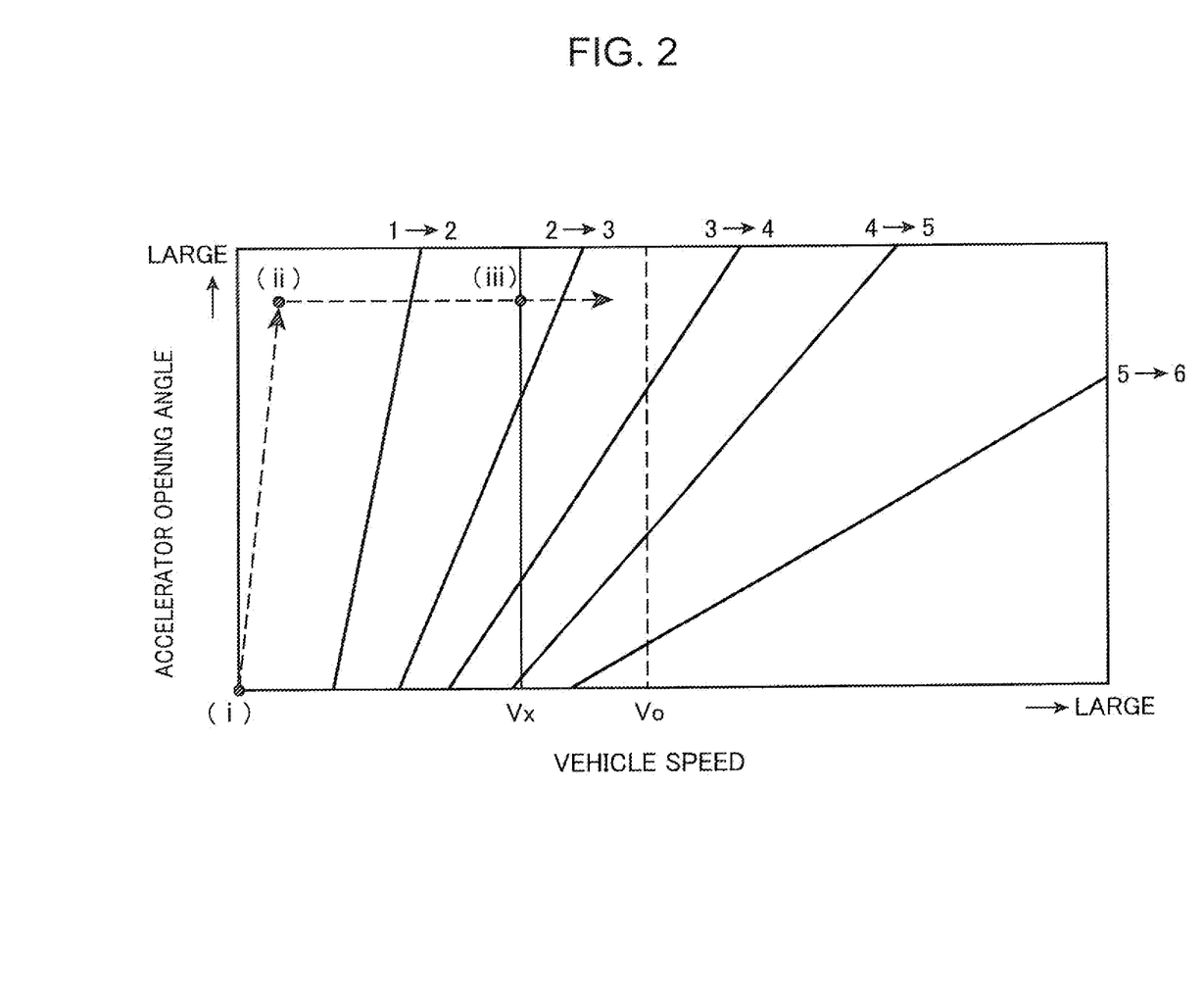
FIG. 2 is a schematic diagram describing an ASL function with which the foregoing vehicle is provided.

FIG. 2 is a conceptual diagram of the gear change map used for the gear stage setting section 11 based on the vehicle speed and the accelerator opening angle (or an open angle of a throttle valve of an electric throttle 31—a throttle opening angle), namely based on a driving state of the vehicle 1. In FIG. 2, gear change lines on which gear stages are shifted up are represented by solid lines. Since FIG. 2 is only a conceptual diagram, positions and shapes of the gear change lines are not limited to those shown in the figure.

In FIG. 2, Vo is a vehicle speed upper limit in the ASL; Vx is a vehicle speed threshold at which the vehicle speed limitation is started. The vehicle speed threshold Vx is a vehicle speed lower than the vehicle speed upper limit Vo by a predetermined vehicle speed. A deviation (Vo−Vx) between the vehicle speed upper limit Vo and the vehicle speed threshold Vx corresponds to a "threshold" of a scope of claims of the present invention.

When the vehicle 1 starts traveling, a drive point nearly shifts from (i) to (ii) to (iii). In other words, when the vehicle 1 stops, the vehicle 1 is at the drive point (i) where both the vehicle speed and the throttle opening angle are 0. When the driver strongly presses the accelerator pedal, as the vehicle 1 starts traveling, it shifts to the drive point (ii) at which the throttle opening angle increases. Thereafter, the pressing amount of the accelerator pedal is kept and the vehicle speed increases. As a result, the vehicle 1 shifts to the drive point (iii). In other words, the vehicle speed increase to the vehicle speed threshold Vx and approaches the vehicle speed upper limit Vo. When the vehicle speed increases to the vehicle speed threshold Vx, the vehicle speed limitation is started, the throttle opening angle of the electric throttle 31, a fuel injection amount of the injector 32, an ignition time of the ignition plug 33, and so forth are adjusted so as to control the output of the engine 2. As a result, even if the driver strongly presses the accelerator pedal, the vehicle speed does not exceed the vehicle speed upper limit Vo. Thus, the control unit 10 of the present embodiment corresponds to an "engine control apparatus" of the present invention.

While the vehicle 1 is shifting from the drive point (ii) to the drive point (iii), the gear stage setting section 11 changes the gear stage of the automatic transmission 3 from the first forward gear stage to the second forward gear stage. According to the present embodiment, since the vehicle speed upper limit Vo is set to a relatively low vehicle speed, while the vehicle 1 is accelerating in a low speed side gear stage such as the second forward gear stage, the vehicle speed increases to the vehicle speed threshold Vx. As a result, the vehicle speed limitation is executed. While the vehicle speed limitation is being executed, if the gear stage of the automatic transmission 3 is fixed to for example the second forward gear stage, since the vehicle 1 continues to travel in a low speed side gear stage having a large gear ratio, a problem of a remarkable decrease in fuel efficiency occurs.

Figure 3:
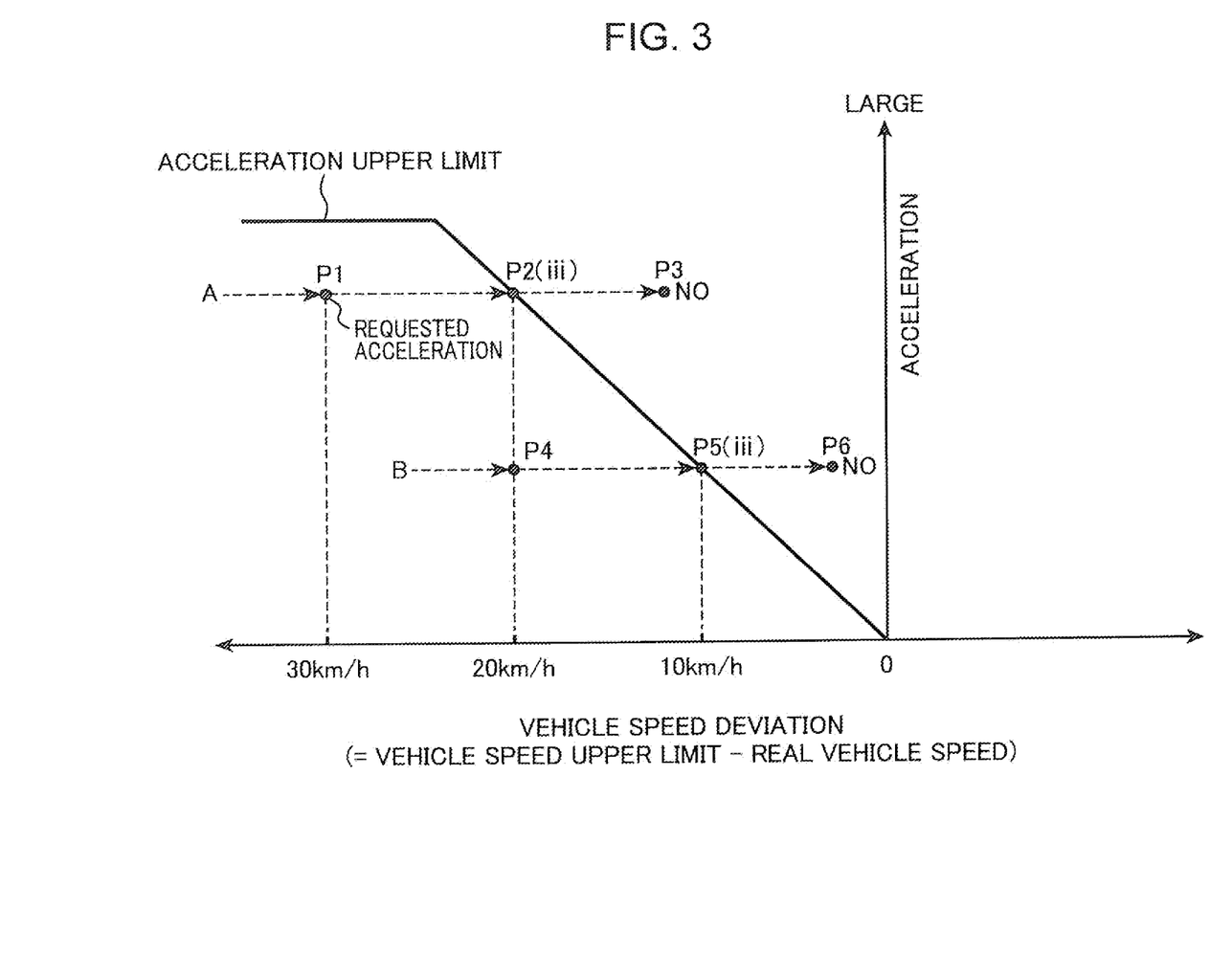
FIG. 3 is a schematic diagram describing a control that causes a threshold at which the vehicle speed limitation is started to be changed in proportion to required acceleration.

FIG. 3 is a characteristic schematic diagram representing a relationship between the vehicle speed deviation and the acceleration upper limit The vehicle speed deviation is a value obtained from a subtraction of a real vehicle speed detected by the vehicle speed sensor 21 from the vehicle speed upper limit Vo (=vehicle speed upper limit Vo−real vehicle speed). Before the vehicle speed reaches the vehicle speed upper limit Vo, since a relationship of real vehicle speed<vehicle speed upper limit Vo is satisfied, the vehicle speed deviation becomes a plus value. If the vehicle speed upper limit Vo is for example 50 km/h and the vehicle speed is 20 km/h, the vehicle speed deviation is 30 km/h. In this case, if the vehicle speed is 30 km/h, the vehicle speed deviation is 20 km/h. In this case, if the vehicle speed is 40 km/h, the vehicle speed deviation is 10 km/h. When the vehicle speed reaches the vehicle speed upper limit Vo, the vehicle speed deviation becomes 0.

In FIG. 3, an acceleration upper limit is an upper limit value of acceleration that can be applied to the vehicle 1 so as to limit the vehicle speed to the vehicle speed upper limit Vo or less. In other words, in each vehicle speed deviation, if the acceleration upper limit is applied to the vehicle 1, the vehicle speed of the vehicle 1 becomes the vehicle speed upper limit Vo. If acceleration exceeding the acceleration upper limit is applied to the vehicle 1, the vehicle speed of the vehicle 1 exceeds the vehicle speed upper limit Vo. If acceleration less than the acceleration upper limit is applied to the vehicle 1, the vehicle speed of the vehicle 1 becomes less than the vehicle speed upper limit Vo.

As shown in the figure, acceleration upper limits are correlated with vehicle speed deviations in a one-to-one relationship. The acceleration upper limits are set in proportion to the vehicle speed deviations (namely in reverse proportion to vehicle speeds).

A driver's requested acceleration is calculated based on the vehicle speed and the accelerator opening angle. If the accelerator opening angle is constant, the requested acceleration is reversely proportional to the vehicle speed, and if the vehicle speed is constant, the requested acceleration is proportional to the accelerator opening angle.

For example, as represented by sign A shown in FIG. 3, if the accelerator opening angle is relatively large, the vehicle speed deviation is 30 km/h at point P1, and the requested acceleration is less than the acceleration upper limit, then even if the requested acceleration is applied to the vehicle 1, the vehicle speed does not exceed the vehicle speed upper limit Vo. Thus, the throttle opening angle corresponding to the accelerator opening angle and the fuel injection amount and the ignition time corresponding to the throttle opening angle are decided and executed so as to achieve the requested acceleration. In addition, the gear stage is set by the gear stage setting section 11 based on the gear change map shown in FIG. 2.

Thereafter, as the vehicle speed increases, the requested acceleration is constant and matches the acceleration upper limit at point P2 where the vehicle speed deviation is 20 km/h. Thus, even if the requested acceleration is applied to the vehicle 1, the vehicle speed does not exceed the vehicle speed upper limit Vo. Thus, the throttle opening angle corresponding to the accelerator opening angle and the fuel injection amount and the ignition time corresponding to the throttle opening angle are decided and executed so as to achieve the requested acceleration. In addition, the gear stage is set by the gear stage setting section 11 based on the gear change map shown in FIG. 2.

However, as the vehicle speed further increases, the requested acceleration is constant and exceeds the acceleration upper limit at point P3 where the vehicle speed deviation is less than 20 km/h. If the requested acceleration is applied to the vehicle 1, the vehicle speed exceeds the vehicle speed upper limit Vo. Thus, the accelerator opening angle is disabled and the throttle opening angle (a value irrespective of the accelerator opening angle) corresponding to the acceleration upper limit and the fuel injection amount and the ignition time corresponding to the throttle opening angle are decided and executed so as to achieve the acceleration upper limit. In other words, the ASL control (vehicle speed limitation control) is executed. While the ASL control is being executed, the control unit 10 does not cause the gear stage setting section 11 to set the gear stage based on the gear change map shown in FIG. 2, but rather causes the shift-up section 12 to set the gear stage based on another control that will be described later (refer to FIG. 4).

In contrast, as represented by sign B shown in FIG. 3, if the accelerator opening angle is relatively small, the vehicle speed deviation is 20 km/h at point P4, and the requested acceleration is less than the acceleration upper limit, then even if the requested acceleration is applied to the vehicle 1, the vehicle speed does not exceed the vehicle speed upper limit Vo. Thus, the throttle opening angle corresponding to the accelerator opening angle and the fuel injection amount and the ignition time corresponding to the throttle opening angle are decided and executed so as to achieve the requested acceleration. In addition, the gear stage is set by the gear stage setting section 11 based on the gear change map shown in FIG. 2.

Thereafter, as the vehicle speed increases, the requested acceleration is constant and matches the acceleration upper limit at point P5 where the vehicle speed deviation is 10 km/h. Thus, even if the requested acceleration is applied to the vehicle 1, the vehicle speed does not exceed the vehicle speed upper limit Vo. Thus, the throttle opening angle corresponding to the accelerator opening angle and the fuel injection amount and the ignition time corresponding to the throttle opening angle are decided and executed so as to achieve the requested acceleration. In addition, the gear stage is set by the gear stage setting section 11 based on the gear change map shown in FIG. 2.

However, as the vehicle speed further increases, the requested acceleration is constant and exceeds the acceleration upper limit at point P6 where the vehicle speed deviation is less than 10 km/h. If the requested acceleration is applied to the vehicle 1, the vehicle speed exceeds the vehicle speed upper limit Vo. Thus, the accelerator opening angle is disabled and the throttle opening angle (a value irrespective of the accelerator opening angle) corresponding to the acceleration upper limit and the fuel injection amount and the ignition time corresponding to the throttle opening angle are decided and executed so as to achieve the acceleration upper limit. In other words, the ASL control (vehicle speed limitation control) is executed. While the ASL control is being executed, the control unit 10 does not cause the gear stage setting section 11 to set the gear stage based on the gear change map shown in FIG. 2, but rather causes the shift-up section 12 to set the gear stage based on another control that will be described later (refer to FIG. 4).

Thus, in a relationship between the requested acceleration and the acceleration upper limit, when the requested acceleration is equal to or less than the acceleration upper limit, the ASL control is not executed. In contrast, when the requested acceleration exceeds the acceleration upper limit, the ASL control is executed.

Thus, in case A, where the accelerator opening angle—the requested acceleration—is relatively large, the vehicle speed threshold Vx is (vehicle speed upper limit Vo−20 km/h). In case B, where the accelerator opening angle—the requested acceleration—is relatively small, the vehicle speed threshold Vx is (vehicle speed upper limit Vo−10 km/h). Thus, the larger the accelerator opening angle—the requested acceleration—is, the larger the threshold at which the vehicle speed limitation is started (the deviation between the vehicle speed upper limit Vo and the vehicle speed threshold Vx: Vo−Vx) becomes. For example, in case A, where the requested acceleration is relatively large, the threshold is 20 km/h because of (Vo−(Vo−20 km/h)). In case B, where the requested acceleration is relatively small, the threshold is 10 km/h because of (Vo−(Vo−10 km/h)). As a result, the larger the requested acceleration is, the earlier the vehicle speed limitation is started. Thus, the control unit 10 of the present embodiment corresponds to a "threshold change apparatus" of the present invention.

Figure 4:
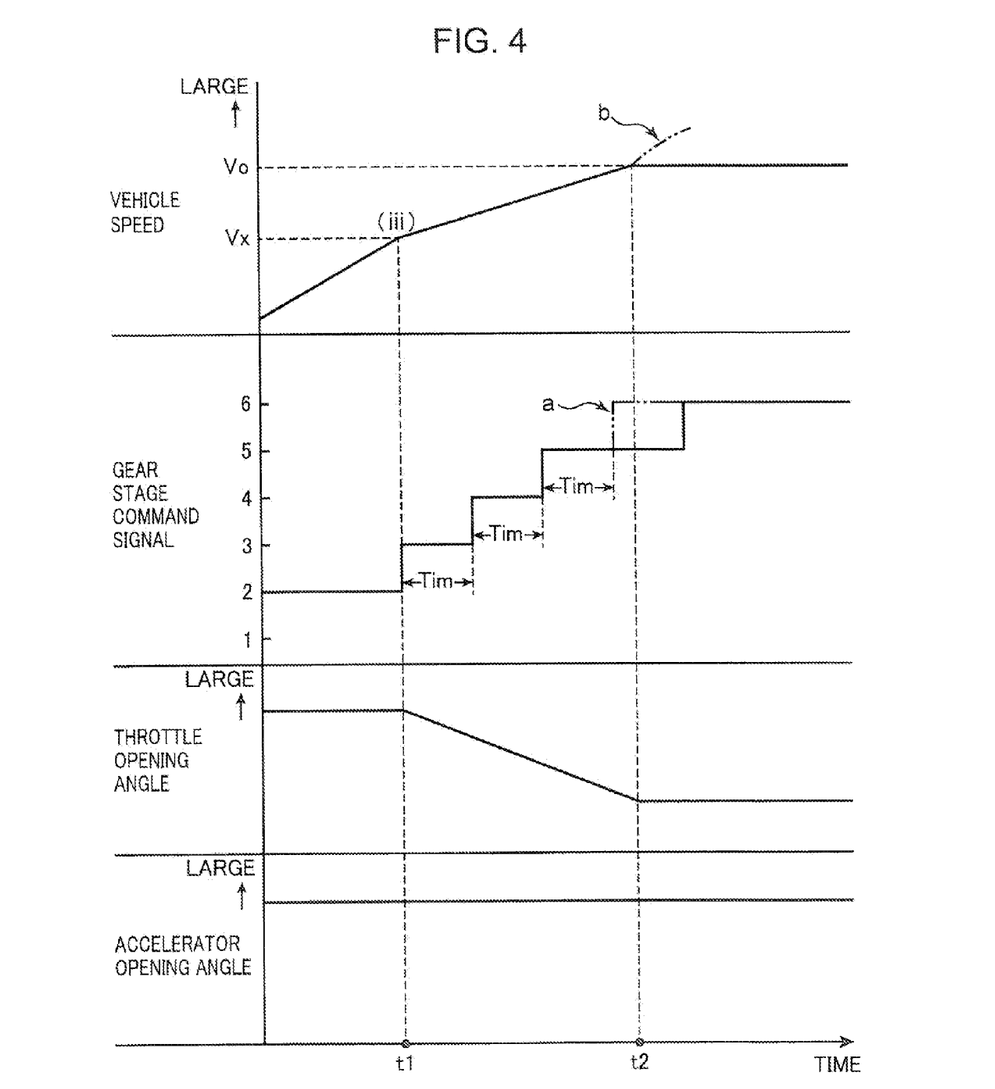
FIG. 4 is a time chart showing an example of an operation of the foregoing ASL function.

FIG. 4 is a time chart showing an example of a specific operation of the ASL control executed by the control unit 10.

In FIG. 4, the accelerator opening angle is kept with a relatively large value. In other words, the driver is relatively strongly pressing the accelerator pedal so as to request relatively large acceleration.

Until time t1 at which the vehicle speed reaches the vehicle speed threshold Vx, the throttle opening angle is a regular value that is set in proportion to the accelerator opening angle, and is kept with a relatively large value like the accelerator opening angle. As a result, the vehicle speed increases. The gear stage is set to the second forward gear stage by the gear stage setting section 11 based on the gear change map shown in FIG. 2.

When the vehicle speed exceeds the vehicle speed threshold Vx, the vehicle speed limitation is started. Thus, after time t1, the throttle opening angle decreases. As a result, since an intake air amount and a fuel injection amount are decreased, the output of the engine 2 is decreased. At this point, the ignition time may be retarded.

After time t2 at which the vehicle speed reaches the vehicle speed upper limit Vo, the throttle opening angle is kept constant so that the vehicle speed is kept at the vehicle speed upper limit Vo.

After time t1 until time t2, the throttle opening angle is gradually decreased. As the vehicle speed increases and approaches the vehicle speed upper limit Vo, as shown in FIG. 3, the acceleration upper limit gradually decreases. When the vehicle speed reaches the vehicle speed upper limit Vo, the acceleration upper limit becomes zero.

In addition, according to the present embodiment, after time t1 at which the vehicle speed limitation is started, the shift-up section 12 shifts up the gear stage of the automatic transmission 3 from the second forward gear stage to the sixth forward gear stage. The sixth forward gear stage is the highest (highest speed side) gear stage having the highest fuel efficiency among the plurality of gear stages (third forward gear stage, fourth forward gear stage, fifth forward gear stage, and sixth forward gear stage) that can be achieved when the vehicle speed is the vehicle speed upper limit Vo.

Thus, as described above, while the vehicle speed limitation is being executed, if the gear stage of the automatic transmission 3 is fixed at the second forward gear stage, since the vehicle 1 continues to travel in a low speed side gear stage having a large gear ratio, the fuel efficiency remarkably decreases. In contrast, according to the present embodiment, the gear stage of the automatic transmission 3 is not fixed to a low speed side gear stage having low fuel efficiency. Instead, the gear stage is shifted up to a high speed side gear stage having a low gear ratio—the sixth forward gear stage (having the highest fuel efficiency). Since the vehicle 1 continues to travel in this state, a problem of a remarkable decrease in fuel efficiency is suppressed. Thus, the gear stage setting section 11 of the present embodiment corresponds to a "gear stage setting apparatus" of the present invention. The shift-up section 12 of the present embodiment corresponds to a "shift-up apparatus" of the present invention.

In addition, since the shift-up section 12 shifts up the gear stage from the second forward gear stage to the sixth forward gear stage one by one in four sessions, changes of gear ratios in shiftups are smaller than the structure in which the gear stage is shifted up from the second forward gear stage to the sixth forward gear stage in one session. As a result, since a torque shock that occurs in shiftups decreases, a deterioration in drivability is suppressed.

The shift-up section 12 shifts up the gear stage from the second forward gear stage to the third forward gear stage, from the third forward gear stage to the fourth forward gear stage, and from the fourth forward gear stage to the fifth forward gear stage each in time Tim preset by a sequential timer. As a result, as represented by sign a shown in FIG. 4, the shift-up section 12 may shift up the gear stage for example from the fifth forward gear stage to the last sixth forward gear stage while the vehicle speed closely approaches the vehicle speed upper limit Vo. In other words, the shift-up section 12 may shift up the gear stage from the fifth forward gear stage to the last sixth forward gear stage when the deviation between the vehicle speed and the vehicle speed upper limit Vo becomes equal to or less than a predetermined reference value α (refer to step S9 shown in FIG. 5) that is less than a threshold (the deviation between the vehicle speed upper limit Vo and the vehicle speed threshold Vx) at time t1 at which the vehicle speed limitation is started. While the shift-up section 12 is shifting up the gear stage, the friction elements of the automatic transmission 3 are changed. Thus, while the friction elements of the automatic transmission 3 are being changed, a torque transmission path of the automatic transmission 3, namely a torque transmission path between the engine 2 side and the drive wheels 4 side is broken. As a result, the vehicle 1 slightly idles. Consequently, while the vehicle speed is closely approaching the vehicle speed upper limit Vo and the friction elements are being changed, if the shift-up section 12 shifts up the gear stage from the fifth forward gear stage to the sixth forward gear stage, as represented by sign b shown in FIG. 4, the vehicle speed is likely to exceed the vehicle speed upper limit Vo. To prevent this situation, while the vehicle speed is closely approaching the vehicle speed upper limit Vo, the control unit 10 causes the shift-up section 12 to wait so as prevent the foregoing fault, and after the vehicle speed is kept at the vehicle speed upper limit Vo, the control unit 10 causes the shift-up section 12 to shift up the gear stage from the fifth forward gear stage to the last sixth forward gear stage.

Next, with reference to a flow chart shown in FIG. 5, an example of a specific operation of the ASL control executed by the control unit 10 will be described.

In step S1, the control unit 10 reads various signals. Thereafter, in step S2, the control unit 10 determines whether or not the vehicle speed limitation function (ASL function) has been enabled. When the ASL switch 23 is ON, the determined result by the control unit 10 is YES. When the ASL switch 23 is OFF, the determined result by the control unit 10 is NO. When the determined result is YES, the process advances to step S3. When the determined result is NO, the process returns to step S1.

In step S3, the control unit 10 calculates the acceleration upper limit from the vehicle speed deviation. In other words, the control unit 10 obtains the acceleration upper limit corresponding to the vehicle speed deviation (=vehicle speed upper limit Vo−real vehicle speed) from the characteristics shown in FIG. 3.

Thereafter, in step 4, the control unit 10 calculates the driver's requested acceleration from the vehicle speed and the accelerator opening angle.

Thereafter, in step S5, the control unit 10 compares the requested acceleration with the acceleration upper limit and determines whether or not the requested acceleration is greater than the acceleration upper limit. When the determined result is NO, namely the requested acceleration is less than the acceleration upper limit (before time t1 shown in FIG. 4), the process advances to step S6. In step S6, the control unit 10 causes the gear stage setting section 11 to set the gear stage of the automatic transmission 3 based on the gear change map shown in FIG. 2 (in a gear stage setting step). In step S7, the control unit 10 decides and executes the throttle opening angle corresponding to the accelerator opening angle, the fuel injection amount and the ignition time corresponding to the throttle opening angle so as to achieve the requested acceleration. Thereafter, the process returns to step S1.

In contrast, when the determined result in step S5 is YES, namely the requested acceleration is greater than the acceleration upper limit (after time t1 shown in FIG. 4), the process advances to step S8. In step S8, the control unit 10 starts the vehicle speed limitation.

Thereafter, in step S9, the control unit 10 determines whether or not the vehicle speed deviation (=vehicle speed upper limit Vo−real vehicle speed) is equal to or less than the predetermined reference value α and whether or not the real acceleration of the vehicle 1 is equal to or greater than predetermined reference value β. In this case, the real acceleration of the vehicle 1 is obtained based on the real vehicle speed detected by the vehicle speed sensor 21. The state in which the real acceleration of the vehicle 1 is equal to or greater than the reference value β is likely to occur due to an external cause such as a steep downhill or overloading.

When the determined result in step S9 is NO, namely while the shift-up section 12 is shifting up the gear stage, since the vehicle speed is not likely to exceed the vehicle speed upper limit Vo, the process advances to step S10. In step S10, the control unit 10 does not cause the gear stage setting section 11 to set the gear stage of the automatic transmission 3, but rather causes the shift-up section 12 immediately to shift up the gear stage to the sixth forward gear stage having optimum fuel efficiency (in a shift-up step). In step S11, the control unit 10 disables the accelerator opening angle and decides and executes the throttle opening angle (a value irrespective of the accelerator opening angle) corresponding to the acceleration upper limit and the fuel injection amount and the ignition time corresponding to the throttle opening angle so as to achieve the acceleration upper limit (in an engine control step). In other words, the control unit 10 executes the ASL control. Thereafter, the process returns to step S1.

In contrast, when the determined result in step S9 is YES, namely while the shift-up section 12 is shifting up the gear stage, since the vehicle speed is likely to exceed the vehicle speed upper limit Vo, the process advances step S12. In step S12, the control unit 10 keeps the gear stage until the real acceleration becomes stable (namely the control unit 10 causes the shift-up section 12 to wait until the vehicle speed becomes the vehicle speed upper limit Vo), the control unit 10 does not cause the gear stage setting section 11 to set the gear stage of the automatic transmission 3, but rather causes the shift-up section 12 to shift up the gear stage to the sixth forward gear stage having optimum fuel efficiency (in a shift-up step). In step S13, the control unit 10 disables the accelerator opening angle and decides and executes the throttle opening angle (a value irrespective of the accelerator opening angle) corresponding to the acceleration upper limit and the fuel injection amount and the ignition time corresponding to the throttle opening angle so as to achieve the acceleration upper limit (in an engine control step). In other words, the control unit 10 executes the ASL control. Thereafter, the process returns to step S1.

In step S5 of the foregoing flow chart, when the requested acceleration is equal to or less than the acceleration upper limit, the output of the engine 2 is not suppressed. In step S5, when the requested acceleration exceeds the acceleration upper limit, the output of the engine 2 is suppressed. Alternatively, when the deviation between the vehicle speed and the vehicle speed upper limit Vo is equal to or greater than the deviation between the vehicle speed upper limit Vo and the vehicle speed threshold Vx, the output of the engine 2 may not be suppressed. When the deviation between the vehicle speed and the vehicle speed upper limit Vo is less than the deviation between the vehicle speed upper limit Vo and the vehicle speed threshold Vx, the output of the engine 2 may be suppressed.

(3) Effect

As described above, the present embodiment is a control device for a vehicle 1 having a vehicle speed sensor 21 that detects a vehicle speed; a vehicle speed upper limit setting switch 24 that sets a vehicle speed upper limit Vo of the vehicle 1; and a control unit 10 that suppresses an output of an engine 2 (in steps S11 and S13) so that the vehicle speed detected by the vehicle speed sensor 21 does not exceed the vehicle speed upper limit Vo, when a deviation between the vehicle speed detected by the vehicle speed sensor 21 and the vehicle speed upper limit Vo that is set by the vehicle speed upper limit setting switch 24 becomes less than a predetermined threshold (a deviation between the vehicle speed upper limit Vo and the vehicle speed threshold Vx) or when a requested acceleration exceeds the acceleration upper limit, in other words when a predetermined condition is satisfied (after time t1 shown in FIG. 4), the vehicle control device including: a gear stage setting section 11 that sets a gear stage of an automatic transmission 3 based on a driving state of the vehicle 1 (in step S6); and a shift-up section 12 that shifts up the gear stage of the automatic transmission 3 to a higher speed side gear stage (sixth forward gear stage) having higher fuel efficiency than a gear stage (second forward gear stage) that is set by the gear stage setting section 11 when the output of the engine 2 is suppressed by the control unit 10 (in steps S10 and S12).

In addition, the present embodiment is a control method for a vehicle 1 including: a vehicle speed detection step for detecting a vehicle speed; a vehicle speed upper limit setting step for setting a vehicle speed upper limit Vo of the vehicle 1; and an engine control step for suppressing an output of an engine 2 (in steps S11 and S13) so that the vehicle speed does not exceed the vehicle speed upper limit Vo, when a deviation between the vehicle speed detected in the vehicle speed detection step and the vehicle speed upper limit Vo that is set in the vehicle speed upper limit setting step becomes less than a predetermined threshold (a deviation between the vehicle speed upper limit Vo and the vehicle speed threshold Vx) or when a requested acceleration exceeds the acceleration upper limit, in other words when a predetermined condition is satisfied (after time t1 shown in FIG. 4), the vehicle control method further including: a gear stage setting step for setting a gear stage of an automatic transmission 3 based on a driving state of the vehicle 1 (in step S6); and a shift-up step for shifting up the gear stage of the automatic transmission 3 to a higher speed side gear stage (sixth forward gear stage) having higher fuel efficiency than a gear stage (second forward gear stage) that is set in the gear stage setting step while the engine control step is being executed (in steps S10 and S12).

According to these structures, in the vehicle 1 that is provided with the ASL function that causes the vehicle speed not to exceed the vehicle speed upper limit Vo, when the deviation between the present vehicle speed and the predetermined vehicle speed upper limit Vo becomes less than the predetermined threshold (the deviation between the vehicle speed upper limit Vo and the vehicle speed threshold Vx) or when the requested acceleration exceeds the acceleration upper limit, the output of the engine 2 is suppressed so that the vehicle speed does not exceed the vehicle speed upper limit Vo. In addition, the gear stage of the automatic transmission 3 is shifted up to a higher speed side gear stage having higher fuel efficiency than a gear stage that is set based on the driving state of the vehicle 1. Thus, while the vehicle speed limitation is being executed (after time t1 shown in FIG. 4), the gear stage of the automatic transmission 3 is not fixed to a low speed side gear stage such as the second forward gear stage having low fuel efficiency. Instead, the gear stage is shifted up to a high speed side gear stage for example the sixth forward gear stage having a low gear ratio. Since the vehicle 1 continues to travel in this state, a problem of a decrease in fuel efficiency is suppressed.

Thus, according to the present embodiment, the control device and control method for the vehicle 1 are provided in which, even if the ASL sets the vehicle speed upper limit Vo to a relatively low vehicle speed, a problem of a decrease in fuel efficiency is suppressed while the ASL is executing the vehicle speed limitation.

According to the present embodiment, the control unit 10 of the vehicle 1 causes the threshold (the deviation between the vehicle speed upper limit Vo and the vehicle speed threshold Vx) to be increased in proportion to the accelerator opening angle detected by the accelerator opening angle sensor 22 (refer to FIG. 3).

According to this structure, since the threshold at which the vehicle speed limitation is started is increased in proportion to the accelerator opening angle, the larger the driver's requested acceleration is, the earlier the vehicle speed limitation is executed. Thus, even if the driver's requested acceleration is large, the vehicle speed can be smoothly converged at the vehicle speed upper limit Vo, not exceeding the vehicle speed upper limit Vo (refer to sign A shown in FIG. 3). In contrast, when the driver's requested acceleration is low, while the driver's requested acceleration is kept as long as possible, the vehicle speed can be converged at the vehicle speed upper limit Vo (refer to sign B shown in FIG. 3).

According to the present embodiment, when the deviation between the vehicle speed upper limit Vo and the vehicle speed becomes equal to or less than the predetermined reference value α that is less than the threshold of time t1 (the deviation between the vehicle speed upper limit Vo and the vehicle speed threshold Vx) at which the vehicle speed limitation is started (YES in step S9), the shift-up section 12 waits until the vehicle speed is kept at the vehicle speed upper limit Vo. After the vehicle speed is kept at the vehicle speed upper limit Vo, the shift-up section 12 shifts up the gear stage (in step S12).

According to this structure, while the present vehicle speed is closely approaching the vehicle speed upper limit Vo, since the shift-up section 12 waits until the vehicle speed is kept at the vehicle speed upper limit Vo, a fault in which while the shift-up section 12 is shifting up the gear stage, the vehicle speed exceeds the vehicle speed upper limit Vo can be prevented (refer to sign b shown in FIG. 4).

According to the present embodiment, the shift-up section 12 shifts up the gear stage of the automatic transmission 3 to a higher gear stage in a plurality of sessions (refer to FIG. 4).

According to this structure, since changes of gear ratios in shiftups are smaller than the structure in which the gear stage is shifted up to a high speed side gear stage one session, a torque shock that occurs in shiftups decreases and a deterioration in drivability is suppressed.

(4) Examples of Modifications

According to the foregoing embodiment, as a high speed side gear stage having higher fuel efficiency than the second forward gear stage, the highest forward gear stage, namely the sixth forward gear stage having the highest fuel efficiency, is selected. Alternatively, as such a gear stage, the fourth forward gear stage or the fifth forward gear stage may be selected. In this case, the gear stage may be shifted up from the second forward gear stage to the fourth forward gear stage or from the second forward gear stage to the fifth forward gear stage in one session.

Figure 5:
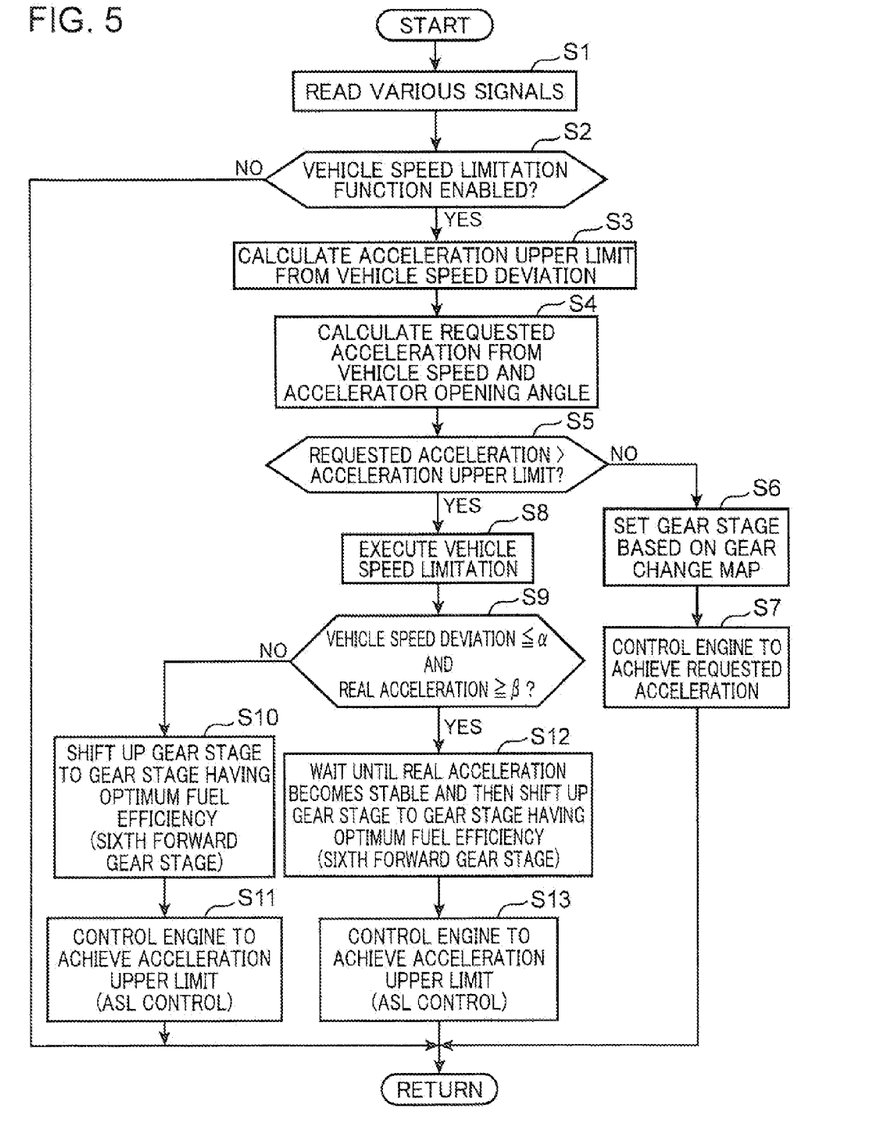
FIG. 5 is a flow chart showing an example of an operation of the foregoing ASL function.

According to the present embodiment, in step S9 shown in FIG. 5, it is determined whether or not the vehicle speed deviation (=vehicle speed upper limit Vo−real vehicle speed) is equal to or less than the predetermined reference value α and whether or not the real acceleration of the vehicle 1 is equal to or greater than the predetermined reference value β. Alternatively, the condition of the real acceleration may be omitted. It may be determined whether or not the vehicle speed deviation (=vehicle speed upper limit Vo−real vehicle speed) is equal to or less than the reference value α.

The present invention can be outlined as follows.

The present invention is a vehicle control device including: vehicle speed detection apparatus for detecting a vehicle speed; vehicle speed upper limit setting apparatus for setting a vehicle speed upper limit of a vehicle; and engine control apparatus for suppressing an output of an engine so that the vehicle speed detected by the vehicle speed detection apparatus does not exceed the vehicle speed upper limit that is set by the vehicle speed upper limit setting apparatus when a predetermined condition is satisfied, the vehicle control device further including: gear stage setting apparatus for setting a gear stage of a transmission based on a driving state of the vehicle; and shift-up apparatus for shifting up the gear stage of the transmission to a higher speed side gear stage having higher fuel efficiency than a gear stage that is set by the gear stage setting apparatus when the output of the engine is suppressed by the engine control apparatus.

According to the present invention, in the vehicle with which the ASL function that causes the vehicle speed not to exceed the vehicle speed upper limit is provided, when a predetermined condition is satisfied, the output of the engine is suppressed so that the vehicle speed does not exceed the vehicle speed upper limit. In addition, the gear stage of the transmission is shifted up to a higher speed side gear stage having higher fuel efficiency than a gear stage that is set based on the driving state of the vehicle. Thus, while the vehicle speed limitation is being executed, the gear stage of the transmission is not fixed to a low speed side gear stage having lower fuel efficiency. Instead, the gear stage is shifted up to a high speed side gear stage, for example the fifth forward gear stage or the sixth forward gear stage having a low gear ratio. Since the vehicle continues to travel in this state, a problem of a decrease in fuel efficiency is suppressed.

Thus, according to the present invention, the vehicle control device is provided in which, even if the ASL sets the vehicle speed upper limit to a relatively low vehicle speed, a problem of a decrease in fuel efficiency is suppressed while the ASL is executing the vehicle speed limitation.

According to the present invention, the engine control apparatus preferably suppresses the output of the engine when a deviation between the vehicle speed and the vehicle speed upper limit becomes less than a predetermined threshold.

According to this structure, when the deviation between the present vehicle speed and the predetermined vehicle speed upper limit is less than the predetermined threshold, the output of the engine is suppressed. In addition, the gear stage of the transmission is shifted up.

According to the present invention, the vehicle control device preferably also includes accelerator opening angle detection apparatus for detecting an accelerator opening angle; and threshold change apparatus for increasing the threshold in proportion to the accelerator opening angle detected by the accelerator opening angle detection apparatus.

According to this structure, since the threshold at which the vehicle speed limitation is started is increased in proportion to the accelerator opening angle, the larger the driver's requested acceleration is, the earlier the vehicle speed limitation is started. Thus, even if the driver's requested acceleration is large, the vehicle speed can be smoothly converged at the vehicle speed upper limit, not exceeding the vehicle speed upper limit. In contrast, when the driver's requested acceleration is low, while the driver's requested acceleration is kept as long as possible, the vehicle speed can be converged at the vehicle speed upper limit According to the present invention, when the deviation becomes equal to or less than a predetermined reference value, which is less than the threshold, the shift-up apparatus preferably waits and after the vehicle speed is kept at the vehicle speed upper limit, the shift-up apparatus shifts up the gear stage.

According to this structure, while the present vehicle speed is closely approaching the vehicle speed upper limit, the shift-up apparatus is caused to wait until the vehicle speed is kept at the vehicle speed upper limit due to a following reason. While the shift-up apparatus is shifting up the gear stage, the friction elements of the automatic transmission are changed. Thus, while the friction elements of the automatic transmission are being changed, a torque transmission path of the automatic transmission, namely a torque transmission path between an engine side and a drive wheel side is broken. As a result, the vehicle slightly idles. Consequently, while the vehicle speed is closely approaching the vehicle speed upper limit and the friction elements are being changed, if the shift-up apparatus shifts up the gear stage, the vehicle speed is likely to exceed the vehicle speed upper limit. To prevent this situation, while the vehicle speed is closely approaching the vehicle speed upper limit, the shift-up apparatus waits so as to prevent the fault in which the vehicle speed exceeds the vehicle speed upper limit After the vehicle speed is kept at the vehicle speed upper limit, the shift-up apparatus shifts up the gear stage to a high speed side gear stage.

According to the present invention, the shift-up apparatus preferably shifts up the gear stage of the transmission in a plurality of sessions.

According to this structure, since changes of gear ratios in shiftups are smaller than the structure in which the gear stage is shifted up to a high speed side gear stage in one session, a torque shock that occurs in shiftups decreases and a deterioration in drivability is suppressed.

The present invention is a vehicle control method including: a vehicle speed detection step for detecting a vehicle speed; a vehicle speed upper limit setting step for setting a vehicle speed upper limit of a vehicle; and an engine control step for suppressing an output of an engine so that the vehicle speed detected in the vehicle speed detection step does not exceed the vehicle speed upper limit that is set in the vehicle speed upper limit setting step when a predetermined condition is satisfied, the vehicle control method further including: a gear stage setting step for setting a gear stage of a transmission based on a driving state of the vehicle; and a shift-up step for shifting up the gear stage of the transmission to a higher speed side gear stage having higher fuel efficiency than a gear stage that is set in the gear stage setting step while the engine control step is being performed.

According to the present invention, a vehicle control method is provided in which, even if the ASL sets the vehicle speed upper limit to a relatively low vehicle speed, a problem of a decrease in fuel efficiency is suppressed while the ASL is executing the vehicle speed limitation.

The present application claims a priority based on Japanese Patent Application JP 2013-094592 filed on Apr. 26, 2013, the entire contents of which being incorporated herein by reference in its entirety.

With reference to the embodiments, the present invention has been described. However, it should be understood by those skilled in the art that the structure and details of the present invention may be changed in various manners without departing from the scope of the present invention. Thus, unless changes or modifications made by those skilled in the art departs from the scope of the present invention, it should be construed that such changes and modifications are included in the scope of the claims of the present invention.

INDUSTRIAL APPLICABILITY

According to the present invention, a vehicle control device and a control method are provided in which, even if the ASL sets the vehicle speed upper limit to a relatively low vehicle speed, a problem of a decrease in fuel efficiency is suppressed while the ASL is executing the vehicle speed limitation. Thus, the present invention contributes to develop and improve the technique for the vehicle with which the ASL function that causes the vehicle speed not to exceed the vehicle speed upper limit is provided.

The invention claimed is:

1. A vehicle control device comprising:
vehicle speed detection apparatus for detecting a vehicle speed;
vehicle speed upper limit setting apparatus for setting a vehicle speed upper limit of a vehicle; and
engine control apparatus for suppressing an output of an engine so that the vehicle speed detected by the vehicle speed detection apparatus does not exceed the vehicle speed upper limit that is set by the vehicle speed upper limit setting apparatus when a predetermined condition is satisfied, the vehicle control device further comprising:
gear stage setting apparatus for setting a gear stage of a transmission based on a driving state of the vehicle; and
shift-up apparatus for shifting up the gear stage of the transmission to a higher speed side gear stage having higher fuel efficiency than a gear stage that is set by the gear stage setting apparatus when the output of the engine is suppressed by the engine control apparatus.

2. The vehicle control device according to claim 1, wherein the engine control apparatus suppresses the output of the engine when a deviation between the vehicle speed and the vehicle speed upper limit becomes less than a predetermined threshold.

3. The vehicle control device according to claim 2, further comprising:
accelerator opening angle detection apparatus for detecting an accelerator opening angle; and
threshold change apparatus for increasing the threshold in proportion to the accelerator opening angle detected by the accelerator opening angle detection apparatus.

4. The vehicle control device according to claim 3, wherein when the deviation becomes equal to or less than a predetermined reference value, which is less than the threshold, the shift-up apparatus waits and after the vehicle speed is kept at the vehicle speed upper limit, the shift-up apparatus shifts up the gear stage.

5. The vehicle control device according to claim 4, wherein the shift-up apparatus shifts up the gear stage of the transmission in a plurality of sessions.

6. The vehicle control device according to claim 5, wherein the shift-up apparatus shifts up the gear stage to the higher speed side gear stage depending on the vehicle speed upper limit that is set by the vehicle speed upper limit setting apparatus.

7. The vehicle control device according to claim 6, wherein the shift-up apparatus shifts up the gear stage to the higher speed side gear stage that is set when the vehicle speed upper limit is set by the vehicle speed upper limit setting apparatus.

8. The vehicle control device according to claim 7, wherein the shift-up apparatus shifts up the gear stage to a highest gear stage having a highest fuel efficiency.

9. The vehicle control device according to claim 8, wherein the gear stage setting apparatus sets the gear stage of the transmission based on the vehicle speed and the accelerator opening angle or a throttle opening angle.

10. The vehicle control device according to claim 2, wherein when the deviation becomes equal to or less than a predetermined reference value, which is less than the threshold, the shift-up apparatus waits and after the vehicle speed is kept at the vehicle speed upper limit, the shift-up apparatus shifts up the gear stage.

11. The vehicle control device according to claim 10, wherein the shift-up apparatus shifts up the gear stage of the transmission in a plurality of sessions.

12. The vehicle control device according to claim 11, wherein the shift-up apparatus shifts up the gear stage to the higher speed side gear stage depending on the vehicle speed upper limit that is set by the vehicle speed upper limit setting apparatus.

13. The vehicle control device according to claim 12, wherein the shift-up apparatus shifts up the gear stage to the higher speed side gear stage that is set when the vehicle speed upper limit is set by the vehicle speed upper limit setting apparatus.

14. The vehicle control device according to claim 13, wherein the shift-up apparatus shifts up the gear stage to a highest gear stage having a highest fuel efficiency.

15. The vehicle control device according to claim 1, wherein the shift-up apparatus shifts up the gear stage of the transmission in a plurality of sessions.

16. The vehicle control device according to claim 1, wherein the shift-up apparatus shifts up the gear stage to the higher speed side gear stage depending on the vehicle speed upper limit that is set by the vehicle speed upper limit setting apparatus.

17. The vehicle control device according to claim 16, wherein the shift-up apparatus shifts up the gear stage to the higher speed side gear stage that is set when the vehicle speed upper limit is set by the vehicle speed upper limit setting apparatus.

18. The vehicle control device according to claim 1, wherein the shift-up apparatus shifts up the gear stage to a highest gear stage having a highest fuel efficiency.

19. The vehicle control device according to claim 1, wherein the gear stage setting apparatus sets the gear stage of the transmission based on the vehicle speed and an accelerator opening angle or a throttle opening angle.

20. A vehicle control method comprising:
a vehicle speed detection step for detecting a vehicle speed;
a vehicle speed upper limit setting step for setting a vehicle speed upper limit of a vehicle; and
an engine control step for suppressing an output of an engine so that the vehicle speed detected in the vehicle speed detection step does not exceed the vehicle speed upper limit that is set in the vehicle speed upper limit setting step when a predetermined condition is satisfied, the vehicle control method further comprising:
a gear stage setting step for setting a gear stage of a transmission based on a driving state of the vehicle; and
a shift-up step for shifting up the gear stage of the transmission to a higher speed side gear stage having higher fuel efficiency than a gear stage that is set in the gear stage setting step while the engine control step is being performed.

21. A vehicle control device comprising:
vehicle speed upper limit setting apparatus for setting a vehicle speed upper limit of a vehicle;
engine control apparatus for suppressing an output of an engine so that a vehicle speed does not exceed the vehicle speed upper limit that is set by the vehicle speed upper limit setting apparatus when a predetermined condition is satisfied;
gear stage setting apparatus for setting a gear stage of a transmission based on a driving state of the vehicle; and
shift-up apparatus for shifting up the gear stage of the transmission to a higher speed side gear stage than a gear stage that is set by the gear stage setting apparatus when the output of the engine is suppressed by the engine control apparatus.

\* \* \* \* \*